United States Patent Office 3,766,236
Patented Oct. 16, 1973

3,766,236
SYNTHESIS OF HALOTHIOLFORMATES
Warren A. Thaler, Matawan, N.J., and Wolfgang H. Mueller, Neuallschwil, Switzerland, assignors to Esso Research and Engineering Company
No Drawing. Continuation-in-part of abandoned application Ser. No. 696,147, Jan. 8, 1968. This application Nov. 27, 1970, Ser. No. 93,480
Int. Cl. C07c *154/00*
U.S. Cl. 260—455 R      10 Claims

ABSTRACT OF THE DISCLOSURE

Halothiolformates are prepared by reacting a sulfenyl halide with carbon monoxide under moderate conditions of temperature and pressure, the products being useful as pesticides and as intermediates for the preparation of carbamate pesticides; reactivity of the sulfenyl halide may be enhanced by heat, polar solvents, and/or Lewis acid catalysts.

This application is a continuation-in-part of application Ser. No. 696,147, filed Jan. 8, 1968, in the names of Warren A. Thaler and Wolfgang H. Mueller, abandoned Dec. 13, 1970.

FIELD OF INVENTION

This invention relates to the synthesis of halothiolformates, which are useful as fumigants, mildew eradicants, herbicides, or as intermediates in the preparation of thiolcarbamate pesticides. More particularly, this invention relates to the reaction of sulfenyl halides with carbon monoxide at moderate temperatures and pressures to yield halothiolformates.

PRIOR ART

Several methods have been developed for the preparation of halothiolformates, e.g., the chloro derivative. However, these methods suffer disadvantages in that yields are low, the products are impure, long reaction periods are required, etc. It has recently been proposed in U.S. Pat. 3,165,544 that chlorothiolformates be prepared by reacting phosgene with a mercaptan. This reaction is accompanied by the formation of one mole of HCl per mole of product and may be illustrated as follows:

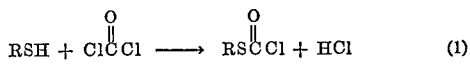   (1)

While this process does achieve a degree of technical success, it, too, suffers some serious drawbacks. Thus, this process necessitates the handling of phosgene, a highly toxic material, and also requires the use of a catalyst. Moreover, the process may be complicated by the destruction of the desired product by the addition of a second mole of mercaptan, illustrated as follows:

   (2)

and, therefore, reagent ratios must be carefully controlled. It has now been found, however, that chlorothiolformates and halothiolformates, generally, may be prepared directly, by the practice of this invention, in high yields without the attendant difficulties of the prior art.

SUMMARY OF THE INVENTION

In accordance with this invention, therefore, halothiolformates are prepared by providing a sulfenyl halide reactant and a reactant comprising carbon monoxide, contacting these reactants, and reacting them under suitable reaction conditions, e.g., room temperature, the reaction being illustrated as follows:

   (3)

where R may include a variety of inorganic or organic groups.

While not wishing to be bound by any particular theory, it is believed that the reactivity of sulfenyl halides toward carbon monoxide appears to be related to the extent of the dissociation of the sulfur-halogen bond as well as the electrophilicity of the incipient sulfenium ion. In this regard, a substituent which permits the greatest extent of polarization of the S—X bond without excessively delocalizing the positive charge on the sulfur is believed to increase the facility with which the sulfenyl halide will react with carbon monoxide to yield halothiolformates. Conversely, a decrease in the positive charge on the sulfur, e.g., as when strong electron donating or withdrawing groups are present will decrease the reactivity of sulfenyl halides toward carbon monoxide.

In another embodiment of this invention, however, the reactivity of sulfenyl halides may be enhanced by (1) using slightly elevated temperatures, (2) employing a polar solvent, (3) employing a Lewis acid catalyst, or (4) by any combination of the foregoing procedures.

Generally, any compound containing a sulfenyl halide group may be employed in the process of this invention. More specifically, however, the sulfenyl halides applicable herein may be represented by the following general formula:

RSX wherein X may be selected from the group consisting of fluorine, chlorine, bromine, and iodine; however, chlorine is generally preferred because of the ready availability of this derivative relative to the other halogen derivatives, and R may represent hydrocarbyl radicals selected from the group consisting of alkyl, cycloalkyl, aryl, alkaryl, aralkyl, radicals, and substituted derivatives thereof. Preferably R is selected from the group consisting of $C_1$ to $C_{20}$ alkyl, $C_5$ to $C_{20}$ cycloalkyl, $C_6$ to $C_{20}$ aryl, $C_7$ to $C_{20}$ alkaryl, $C_7$ to $C_{20}$ aralkyl radicals and substituted derivatives thereof. Most preferably R is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl and $C_7$ to $C_{10}$ aralkyl radicals.

The substituents within the scope of the instant invention include halogen, nitrogen, oxygen, sulfur, and phosphorous containing groups. More particularly, the substituents include functional groups having the following general formulas:

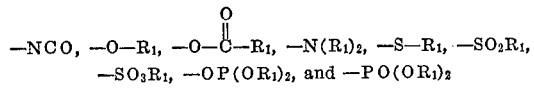

wherein $R_1$ is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl and $C_7$ to $C_{10}$ aralkyl radicals. Preferably $R_1$ is selected from the group consisting of $C_1$ to $C_6$ alkyl radicals. It is imperative that no more than one such substituent be located on the α carbon atom, otherwise the reaction rate will be severely retarded. The α carbon is defined as the carbon to which the sulfenyl halide group is directly attached. Preferably there are no substituents on the α carbon. When the sulfenyl halide is attached directly to an aryl nucleus there can be no more than one substituent attached to the same nucleus or if there are two or more substituents attached, said substituents must have Hammett sigma values ranging from about −0.4 to about +0.4. Preferably there are two or less substituents attached to the aryl nucleus.

The Hemmett sigma value is a measure of electron withdrawing or donating ability of the substituent and may be obtained by a comparison of the dissociation constant of benzoic acid with and without the substituent in question substituted on the ring. Hammett sigma values for various substituent groups may be found in "Basic Principles of Organic Chemistry," Roberts and Caserio (New York, 1964), at p. 956, hereby incorporated by reference.

The limiting sigma values for the purposes of this invention are the para sigma values for the substituent in question determined from the dissociation of para substituted benzoic acids. It is emphasized that for the purposes of this invention these designated sigma values are the limiting values regardless of the aromatic nucleus and the position of the substituent in the aromatic nucleus relative to the sulfenyl chloride group.

It is thus apparent that compounds such as trichloromethylsulfenyl chloride, 2,4-dinitrobenzene sulfenyl chloride, sulfur dichloride, dimethylaminosulfenyl chloride, etc. are not within the scope of the instant invention.

Sulfenyl halides, which contain functional groups capable of reacting with the sulfenyl halide group, under the reaction conditions chosen, are also not within the scope of the instant invention.

Unsubstituted hydrocarbyl radicals of the aforementioned classes are most preferred for use in the instant invention.

Specific sulfenyl halides which may be used within the scope of the instant invention include methanesulfenyl chloride,
ethanesulfenyl chloride,
2-methylpropanesulfenyl chloride,
dodecanesulfenyl chloride,
eicosanesulfenyl chloride,
cyclopentanesulfenyl chloride,
cyclooctanesulfenyl chloride,
chloromethanesulfenyl chloride,
chloroethanesulfenyl chloride,
chlorosulfenylethanesulfenyl chloride ($ClSCH_2CH_2SCl$),
chlorothioformylethanesulfenyl chloride
  ($ClC(O)SCH_2CH_2SCl$),
3-bromopropanesulfenyl chloride,
2,2-dichloropropanesulfenyl chloride,
chlorocarbonylpropanesulfenyl chloride,
$Cl(O)CCH_2CH_2CH_2SCl$,
methanesulfenyl bromide,
5-(dimethylamino)pentanesulfenyl chloride,
3-(dichlorophosphino)propanesulfenyl chloride,
benzenesulfenyl chloride,
benzenesulfenyl bromide,
p-chlorobenzenesulfenyl chloride,
2,4-dichlorobenzenesulfenyl chloride,
α-naphthylenesulfenyl chloride,
m-chloroformylbenzenesulfenyl chloride,
p-tolylsulfenyl chloride,
p-isocyanatobenzenesulfenyl chloride, etc.

The sulfenyl halide-carbon monoxide reaction is a facile one and can generally be conducted at moderate reaction conditions without the necessity of employing a catalyst. Reaction conditions, therefore, may vary rather widely, and the only limiting factor is that the carbon monoxide and the sulfenyl halide compound be in intimate contact. Such contact may be afforded by contacting the sulfenyl halide compound either as a liquid or as a gas with the carbon monoxide. While the gaseous phase is sometimes desirable e.g., when the sulfenyl halide is volatile or is employed under conditions that make it volatile, reactions occurring with the sufenyl halide in the liquid phase are generally preferred. Under these preferred conditions it is only necessary that the sulfenyl halide compound be liquid and stable. Normally such conditions occur at temperatures below about 50° C., although higher temperatures may be employed with less volatile compounds or when gas phase reactions are desired. Decreasing temperatures tend to reduce the reaction rate and also to reduce undesirable thermal decomposition of the sulfenyl halide. Thus temperatures ranging from about —40° C. to about 200° C. are suitable, while temperatures of 0° to 50° C. are more preferred, and room temperature, i.e., 18° to 25° C., may be advantageously employed resulting in reasonable reaction rates even with relatively unstable sulfenyl halides, e.g., methane sulfenyl chloride which nomally must be stored under refrigeration.

Carbon monoxide gas pressures are similarly not critical and may also vary widely, for example, subatmospheric, e.g., 0.5 atm. to superatmospheric. The carbon monoxide reactant may be provided either by itself or in conjunction with an inert gas, such as air, nitrogen, helium, argon and the like, and, therefore, the pressures listed herein may be absolute carbon monoxide or carbon monoxide partial pressures. Generally, however, pressures of at least about 1 atm. of carbon monoxide, preferably about 15 to 6000 p.s.i., more preferably about 300 to 6000 p.s.i., are employed.

The reaction is generally continued for a period of time sufficient to allow for the reaction of substantially all of the sulfenyl halide compound, e.g., several hours, but may range from a few minutes, e.g., 10 minutes, to many hours. The product halothioformates may then be recovered by a variety of techniques, e.g., distillation, liquid-liquid extraction, etc., as well as other known techniques. Additionally, the reaction may be effected under batch or continuous conditions utilizing such standard equipment as pressure bombs, or gas-liquid contacting apparatus, e.g., packed towers, respectively.

As previously mentioned, it is normally desirable to conduct the inventive process described herein by providing the sulfenyl halide compound in the liquid phase. This can be accomplished by using sulfenyl halides that are liquid or will liquefy, e.g., by melting or by solution in a suitable solvent, at reaction conditions. In this regard, the sulfenyl halide compound itself may be employed to provide a liquid reaction medium or solvents and/or diluents may be utilized to provide a liquid reaction medium, e.g., dissolving dimethylene bis(sulfenyl chloride) in carbon tetrachloride. Thus, such solvents/diluents as paraffins, e.g., $C_5-C_{20}$ paraffins such as pentane, hexane, heptane, octane, isooctane, nonane, cyclododecane, etc.; aromatics, e.g., $C_6-C_{20}$ aromatics such as benzene, toluene, xylene, etc., and halogenated derivatives of the foregoing, e.g., methylene chloride, chloroform, carbon tetrachloride, chlorobenzene, etc., may be employed. Further, and in accordance with the theoretical aspects of this invention previously discussed, polar solvents which cause greater polarization of the S-X bond can also be employed. Thus, such polar solvents as ethers, e.g., diethyl ether, tetrahydrofuran, dioxane; esters, e.g., ethyl acetate, and the like; nitriles, e.g., acetonitrile, benzonitrile; formamides, e.g., dimethyl formamide, can also be employed. Hydroxylic solvents, however, such as water, alcohols, etc., should generally be avoided since these tend to react with the sulfenyl halide in preference to the carbon monoxide. It is apparent then that polar solvents can be used to great advantage in situations where the S—X bond is not readily reactive, e.g., when electron withdrawing or electron donating groups are present in the sulfenyl halide compound, or reacts at relatively slow rates, i.e., sluggish reactions.

In another embodiment of this invention, it has been found that reaction rates may be further enhanced by utilizing a Lewis acid catalyst. Lewis acids are generally defined as electron pair acceptors. Typical examples of such compounds are boron fluoride, aluminum chloride, rhenium chloride, trimethyl boron, ferric chloride, antimony chloride, to name just a few. These catalysts are believed to aid in polarizing the S—X bond, thereby making it more reactive toward carbon monoxide. The Lewis acid catalysts may be employed in catalytic amounts, e.g., about 0.01–5.0 wt. percent based on sulfenyl halide, or in amounts ranging up to and above the amount of halothiolformate formed, that is, to overcome complexing of some Lewis acids, e.g., aluminum chloride, with the halothiolformate.

Additionally, the reaction mechanism set forth herein is equally applicable to compounds having more than one sulfenyl chloride grouping, e.g., bis compounds such as dimethylene bis(sulfenyl chloride), trimethylene bis(sulfenyl chloride), etc.

The sulfenyl halide compounds, e.g., sulfenyl chlorides, employed in this invention may be prepared by a variety of techniques. For example, they may be prepared from mercaptans by reaction with chlorine. However, this method can be costly due to the loss of one mole of HCl formed with each mole of sulfenyl chloride product, as illustrated by $$RSH + Cl_2 \rightarrow RSCl + HCl \quad (4)$$

Preferably, however, the sulfenyl chlorides are formed by (1) the reaction of chlorine or chlorinating agents, such as sulfenyl chloride with disulfides, as illustrated by $$RSSR + Cl_2 \rightarrow 2RSCl \quad (5)$$

or (2) by double bond addition reactions between the olefin and sulfur dichloride

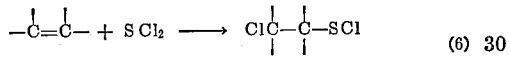

(6)

Examples of these methods are reported in H. Brintzinger et al., Ber. 83, 87 (1950), and U.S. 2,929,820.

Various of the compounds prepared herein are useful as fumigants against *A. niger*, nematodes, *F. solani*, and *R. solani*, mildew eradicants, herbicides against squash and soybeans, as agents for the control of rust, as pesticides against mites and houseflies. See U.S. Pat. 3,165,544 for details regarding the use of these compounds in the mentioned environments. Additionally, the halothioformates may be reacted with various amines to yield thiolcarbamates, which are active as pre-emergence herbicides. This reaction, which employs the halothioformate as an intermediate, the halogen being eliminated during the reaction, may be effected by adding a halothioformate to an appropriate amine, e.g., di-n-propyl amine, ethyl n-butyl amine in an ether solvent, with cooling. The amine hydrochloride readily precipitates upon standing of the reaction mixture and can be removed by water washing. Untreated amine is removed by acid wash and the resulting ether solution is dried over magnesium sulfate, filtered, and the ether driven off. The product may be redistilled, if desired.

When halothiolformates, particularly the chlorothiolformates, of this invention are employed as pesticides, they may be used in either liquid or solid form. When used as a solid, they may be reduced ot an impalpable powder and applied as an undiluted dust or mixed with a solid carrier, such as clay, bentonite, talc, etc. Pesticidal compositions can also be applied as an atomized spray or in liquid carrier, either as a solution in a solvent or as an emulsion in a nonsolvent, e.g., water. Typical liquid solvents include aromatics, e.g., benzene, xylene, naphtha, etc. Suitable wetting agents for preparing emulsions are long chain alcohols, sulfonated amide or ester derivatives of fatty acids, and the like.

Having now described this invention, the following examples will further illustrate the novel process reported herein. However, no limitations other than those in the claims appended hereto are to be implied since modifications and variations of the following procedures will be obvious to those skilled in the art.

The following experiments were carried out in either a glass aerosol bottle [CO <1000 p.s.i.] or a glass lined high pressure Aminco microbomb.

EXAMPLE 1

Methyl chlorothiolformate

Methanesulfenyl chloride 20.7 g. (0.25 mole) was shaken at 25° C. in a pressure vessel with 1000 p.s.i. carbon monoxide for 7 hours. At the end of the time the CO was vented and 25.9 g. of product was recovered, 94% crude yield $n_D^{30}$ 1.4898. N.M.R. analysis showed that the sulfenyl chloride was absent and a new singlet corresponding to methyl chlorothiolformate of 97+% purity was present.

Distillation 54° (103 mm.) of this yellow liquid gave an 87.6% over-all yield of product $n_D^{30}$ 1.4865 which was lighter in color.

When isopropane, hexane, cyclopentane, n-decane or eicosane sulfenyl chloride are substituted for methane sulfenyl chloride in the above reaction, similar results are obtained in that the corresponding chlorothiolformate is produced.

EXAMPLE 2

Methyl chlorothiolformate

Methanesulfenyl chloride 4.12 g. (0.05 mole) in a glass vessel was stirred at the pressure of 300 p.s.i. carbon monoxide at 25°. A sample withdrawn after 4 hours showed 60% conversion by means of N.M.R. analysis. After standing overnight a second sample was withdrawn and analysis showed 100% reaction had taken place during this interval.

When methanesulfenyl bromide is substituted for methanesulfenyl chloride in the above reaction, similar results are obtained in that methyl bromothiolformate is produced.

EXAMPLE 3

Methyl chlorothiolformate

Methane sulfenyl chloride and an aquivalent weight of methylene chloride were shaken with 6000 p.s.i. carbon monoxide for 21.5 hours at 25° C. Distillation 42–50° (80–90 mm.) gave a yellow liquid $n_D^{30}$ 1.4849 which was water white after a second distillation $n_D^{30}$ 1.4849 (90% recovery).

*Analysis.*—Calcd. for $C_2H_3ClOS$ (percent): C, 21.72; H, 2.73; Cl, 32.07. Found (percent): C, 21.71; H, 2.71; Cl, 32.03.

When 3-chloropropane, 3-bromobutane, chlorocarbonyl propane, 5-(dimethylamino)pentane, 3-dichlorophosphino)propane, or chlorothiolformyl ethane sulfenyl chloride is substituted for methane sulfenyl chloride in the above reaction, similar results are obtained in that the corresponding chlorothiolformate is produced.

EXAMPLE 4

Dimethylene bis(chlorothiolformate)

Dimethylene bis(sulfenyl chloride) 16.3 g. (0.1 mole) in 20 g. of $CCl_4$ were shaken with 1000 p.s.i. CO for 23 hours at 25° C. Nuclear magnetic resonance spectra showed the complete absence of sulfenyl chloride (213 c.p.s.) and presence of a new singlet absorption at 203 c.p.s., and indicated that the product had a purity of about 90%. The infrared showed strong absorptions at 5.68 and 5.98 microns characteristic of chlorothiolformate. The product underwent extensive decomposition upon distillation in vacuo.

EXAMPLE 5

Phenyl chlorothiolformate

Benzensulfenyl chloride 14.45 g. (0.1 mole) was placed in a pressure vessel and shaken at 25° C. for 22 hours under 2000 p.s.i. carbon monoxide. At the end of this time the CO was vented and 16.82 g. (97.4% yield) of a liquid and 0.2 g. of a suspended solid were recovered. The red color of the sulfenyl chloride was absent and the liquid had a pale yellow color $n_D^{30}$ 1.5805.

Distillation of this liquid 105° (15 mm.) gave 90% recovery of a colorless liquid $n_D^{30}$ 1.5793, 87.8% over-all yield.

EXAMPLE 6

Phenyl chlorothiolformate

Benzenesulfenyl chloride 14.45 g. (0.1 mole) was placed in a pressure vessel and shaken at 25° C. for 3 days with 6000 p.s.i. carbon monoxide. After venting 17.07 g. of a yellow liquid (98.6% yield) $n_D^{30}$ 1.5831 was present. This liquid was fractionated by distillation and the boiling point range was 96–99.5° (12 mm.) and the corresponding refractive index range was $n_D^{30}$ 1.5787–1.5791. A 95% over-all yield of product was isolated in this fashion.

*Analysis.*—Calcd. for $C_7H_5ClOS$ (percent): C, 48.70; H, 2.92; Cl, 20.55; S, 18.58. Found: C, 48.41; H, 2.87; Cl, 20.89; S, 18.85.

When p-chlorobenzene, 6-fluorobenzene, m-methoxybenzene, or α-naphthylene sulfenyl chloride are substituted for benzene sulfenyl chloride in the above reaction, similar results are obtained in that the corresponding chlorothiolformate is produced.

EXAMPLE 7

Methyl chlorothiolformate

Methanesulfenyl chloride 20.7 g. (0.25 mole) and rhenium chloride 1.3 g. are shaken at ambient temperature with carbon monoxide at 300 p.s.i. for 2.5 hours. Workup according to the procedure of Example 1 gives 90–95% yield of methyl chlorothiolformate.

Other Lewis acids such as aluminum chloride will require larger quantities of catalyst to enhance the reaction rate due to the complexing of catalyst with the chlorothiolformate product. Similar results are obtained with boron fluoride and antimony chloride.

What is claimed is:

1. A process for preparing halothiolformates which comprises providing a reactant comprising a sulfenyl halide compound having the formula RSX, wherein X is a halogen selected from the group consisting of chlorine and bromine, and R is a hydrocarbyl radical selected from the group consisting of $C_1$ to $C_{20}$ alkyl, $C_5$ to $C_{20}$ cycloalkyl, $C_7$ to $C_{20}$ aralkyl; substituted derivatives thereof wherein the substituents are selected from the class consisting of halogen, and substituents having the general formulas

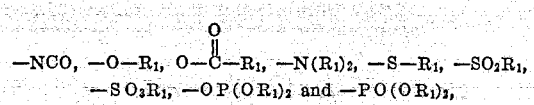

wherein $R_1$ is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl, and $C_7$ to $C_{10}$ aralkyl radicals, and no more than one substituent is present on the alpha carbon; $C_6$ to $C_{20}$ aryl, $C_7$ to $C_{20}$ alkaryl; and substituted derivatives thereof, wherein the substituents are selected from the class consisting of halogen, and substituents having the general formulas

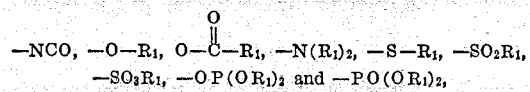

wherein $R_1$ is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl, and $C_7$ to $C_{10}$ aralkyl radicals, said substituents having Hammett sigma values of from about −0.4 to about +0.4 when two or more are present on the same ring as the sulfenyl halide group; providing a second reactant comprising carbon monoxide, and contacting said reactants at a temperature of from about −40° C. to about 200° C. and a pressure of from about 15 to 6000 p.s.i.

2. The process of claim 1 wherein a Lewis acid catalyst is employed.

3. The process of claim 1 wherein the sulfenyl halide is dissolved in an inert polar solvent.

4. The process of claim 3 wherein the solvent is non-hydroxylic.

5. A process for preparing halothiolformates which comprises providing a reactant comprising a sulfenyl halide compound having the formula RSX wherein X is a halogen selected from the group consisting of chlorine and bromine and R is a hydrocarbyl radical selected from the group consisting of $C_1$ to $C_{10}$ alkyl, $C_5$ to $C_{10}$ cycloalkyl; substituted derivatives thereof, wherein the substituents are selected from the class consisting of halogen, and substituents having the general formulas

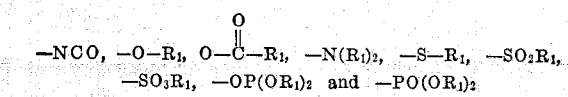

wherein $R_1$ is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl, and $C_7$ to $C_{10}$ aralkyl radicals, and no substituent is present on the alpha carbon; $C_6$ to $C_{10}$ aryl; and substituted derivatives thereof wherein the substituents are selected from the class consisting of halogen, and substituents having the general formulas

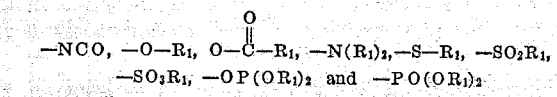

wherein $R_1$ is selected from the group consisting of $C_1$ to $C_{10}$ alkyl, $C_5$ to $C_{10}$ cycloalkyl, $C_6$ to $C_{10}$ aryl, $C_7$ to $C_{10}$ alkaryl, and $C_7$ to $C_{10}$ aralkyl radicals, and no more than two substituents are attached to the same ring as the sulfenyl halide group; providing a second reactant comprising carbon monoxide, and contacting said reactants at a temperature of from about −40° C. to about 200° C. and a pressure of from about 15 to 6000 p.s.i.

6. A process for preparing halothiolformates which comprises providing a reactant comprising a sulfenyl halide compound having the formula RSX wherein X is a halogen selected from the group consisting of chlorine and bromine and R is a hydrocarbyl radical selected from the group consisting of $C_1$ to $C_{20}$ alkyl and $C_6$ to $C_{20}$ aryl, providing a second reactant comprising carbon monoxide, and contacting said reactants at a temperature of from about −40° C. to about 200° C. and at a pressure of from about 15 to 6000 p.s.i.

7. The process of claim 6 wherein R is methyl and X is chlorine.

8. The process of claim 6 wherein R is phenyl and X is chlorine.

9. The process of claim 1 wherein said reactants are contacted at a temperature of from 0° to 50° C. and a pressure of from 300 to 6000 p.s.i.

10. A process for preparing dimethylene bis(chlorothiolformate) which comprises providing a reactant comprising dimethylene bis(sulfenyl chloride), providing a second reactant comprising carbon monoxide and contacting said reactants at a temperature of from about −40° C. to about 200° C. and a pressure of from about 15 to 6,000 p.s.i.

(References on following page)

References Cited

FOREIGN PATENTS 957,102  5/1964  Great Britain ----- 260—455 R

OTHER REFERENCES

Thaler: "CO Reactions; A Novel Syn. of Acid Chlorides" (1966), JACS, 88, pp. 4278–79 (1966).

Walling et al.: "Some Extensions of the Reaction Etc.," (1959), JACS, 82, pp. 2181–84 (1960).

Kharasch: "Organic Sulfur Comounds" (1961), Pergamon Press, New York, vol. I, p. 387 (1961).

Bechtold: "Determination of the Standard Gibbs Free Energy Etc., (1965), CA, 63, pp. 10759–60 (1965).

GLENNON H. HOLLRAH, Primary Examiner

U.S. Cl. X.R.

71—79, 86, 100; 260—453 AR, 543 H, 544 M, 544 Y; 424—212, 301